United States Patent [19]

Roush

[11] Patent Number: 4,736,803

[45] Date of Patent: Apr. 12, 1988

[54] SELF-ADJUSTING SCRAPERS FOR DOUBLE DISK OPENERS

[75] Inventor: Daniel E. Roush, Niles, Ill.

[73] Assignee: J. I. Case Company, Racine, Wis.

[21] Appl. No.: 907,830

[22] Filed: Sep. 16, 1986

[51] Int. Cl.$^4$ .................. A01C 7/16; A01B 15/16; A01B 23/06

[52] U.S. Cl. .................. 172/560; 172/566; 111/88

[58] Field of Search .............. 172/560, 566, 558, 561, 172/559, 562; 16/355, 356; 111/88

[56] References Cited

U.S. PATENT DOCUMENTS

| | | | |
|---|---|---|---|
| 139,290 | 5/1873 | Bradley | 16/355 |
| 618,110 | 1/1899 | Lundy | 111/88 |
| 734,017 | 7/1903 | Van Brunt | 172/560 |
| 1,017,318 | 2/1912 | Rieske | 172/566 X |
| 1,264,970 | 5/1918 | Pfeifer | 172/560 |
| 4,206,817 | 6/1980 | Bowerman | 172/560 |
| 4,373,456 | 2/1983 | Westerfield | 111/88 |

FOREIGN PATENT DOCUMENTS

263,941 1/1927 United Kingdom ............... 16/355

Primary Examiner—Richard J. Johnson
Attorney, Agent, or Firm—Peter N. Jansson, Ltd.

[57] ABSTRACT

An improved double disk scraper assembly having a pivot post projecting rearwardly from the principal vertical support, a first scraper with a first pivot end on the post and a second scraper with a second pivot end on the first pivot end. The first and second pivot ends are preferably sleeved members. The scrapers are each engaged with a disk under the direct force of a biasing means, preferably a coil spring, between them. The pivot independently within a limited range which serves to keep the biasing means in place. A seed tube passes vertically between the scrapers for seed deposition at a forward position.

18 Claims, 2 Drawing Sheets

SELF-ADJUSTING SCRAPERS FOR DOUBLE DISK OPENERS

FIELD OF THE INVENTION

This invention is related generally to planting equipment for use in agriculture and, more particularly, to scraper assemblies for removing soil from the inside surfaces of double disk openers.

BACKGROUND OF THE INVENTION

In planting operations using double disk furrow openers, many soil conditions require the use of scrapers between the two disks of each disk set to remove soil which clings to the inside surfaces or the disks. Removing soil clinging to the inside surfaces ot the disks is particularly difficult in heavy clay soil, and most difficult when planting is done when such soil is wet.

Accumulations of dirt can stop the turning of the disks, which renders them ineffective for proper opening of furrows for seeding. Improper or uneven removal of clods of soil can cause other problems, such as uneven planting depths. Thus, consistent and reliable removal of dirt as the disks turn is essential to proper planting operations. In heavy clay soil, particularly when it is moist, strong solidly-supported substantial scraping structures are required to successfully keep the disks clean and free-running.

It is highly desirable to deposit seeds into the furrows created by double disk sets at positions as far forward as possible, before the furrows have an opportunity to collapse or before dirt particles or clods which are scraped from the disks fall into the furrows and cause unacceptable variations in the depth of planting.

Thus, there is a need on the one hand for substantial solidly-mounted scraper in the position immediately behind the support on which the disks are mounted and a need on the other hand for providing seed deposition at the same fairly forward location.

The prior art includes a number of devices for scraping the inside surfaces of double disk sets. Examples of such prior art structures are disclosed in U.S. Pat. Nos. 4,337,835 (Steilen), 4,206,817 (Bowerman), 1,113,776 (Goetz), 1,264,970 (Pfeifer), 975,499 (Beeman), 785,865 (Davis), and 718,885 (Stephenson).

The devices of the prior art have a number of problems and disadvantages. In some cases, the blades do not consistently remain in engagement with the inside surfaces of the disks. In other cases, they fail in the task of stripping heavy dirt accumulations. Scraper structures of the prior art are often too flimsy or improperly mounted for a heavy stripping task. In some cases, the scraper blades do not respond sufficiently to the separate wobbling motions of the two adjacent disks; that is, scrapers for the two disks sometimes do not operate independently enough to be fully effective.

While a number of problems and disadvantages exist, it is sufficient to note that there is a need for an improved selfadjusting double disk scraper assembly, particularly one which can operate effectively in moist, heavy clay soil.

OBJECTS OF THE INVENTION

It is an object of this invention to provide an improved double disk scraper assembly overcoming certain of the problems and deficiencies of devices of the prior art.

Another object of this invention is to provide a double disk scraper assembly which has substantially improved sturdiness and strength.

Another object of this invention is to provide a sturdy, effective double disk scraper assembly allowing seeds to be deposited from a position close to the vertical disk support.

Another object of this invention is to provide a double disk assembly with a seed tube between the scraping blades.

Another object of this invention is to provide a double disk assembly which improves the consistency in planting depth, even in difficult soil conditions.

Another object of this invention is to provide a double disk scraper assembly having a pair of scrapers operating with improved independence to conform to wobbles in their disks.

Another object of this invention is to provide a double disk scraper assembly having a biasing means which applies outward force directly and reliably, overcoming some of the problems and shortcomings of the prior art.

These and other important objects will be apparent from the descriptions of this invention which follow.

SUMMARY OF THE INVENTION

This invention is an improved double disk scraper assembly overcoming certain problems and deficiencies of prior art devices. The scrape assembly of this invention is of the type having a scraper support between first and second disks, scraper blades secured to the support, and means biasing the blades into contact with the inside surfaces of the disks.

The invention includes a pivot post projecting rearwardly from the support, a first scraper having a first pivot end pivotably mounted on the pivot post and a first blade engaging the first disk, and a second scraper having a second pivot end pivotably mounted on the first pivot end and a second blade engaging the second disk. Thus, the scrapers have an essentially common pivot point.

In a highly preferred embodiment, the first pivot end is a first tube-like straight annular member with a cylindrical first opening receiving the pivot post and a cylindrical outer surface interrupted at one position by the extension from it of the remainder of the first scraper. The second pivot end is a second tube-like straight annular member with a cylindrical second opening receiving the first annular member. The second annular member is interrupted by a gap thereon through which the first scraper extends.

The gap is configured in a particular way with respect to the cross-dimension of the first scraper in the gap. More specifically, the gap is wider than the first scraper such that the first and second scrapers can pivot independently. In preferred embodiments, however, the gap is also narrow enough to impose rotational limitations on the pivotability of the first and second scrapers. Such limitations are sufficient to keep a biasing means, which extends between the first and second scrapers, properly in place to bias the scrapers into engagement with their respective disks.

The first and second scrapers preferably have means at intermediate positions along their lengths for securing a single biasing means in compression between them. Such securing means are preferably a pair of opposed substantially coaxially-aligned nubs, and the biasing means is preferably a coil spring receiving the nubs at either end. Such structure has been found to be effective in applying a steady and substantially even blade pressure on the inside surfaces of the disks, even though such blades wobble independently during operation of the double disk.

In preferred embodiments, the pivot post, which projects rearwardly from the support between the disks, is angled above the horizontal. This positions and orients the scraper blades for effective removal of dirt. In the most preferred embodiments, the blades are tilted off-radius with respect to the disks, preferably by tan angle of about fifteen degrees, such off-radius tilting being in a direction toward the rear so that dirt scraped from the disk is directed more toward the rear and away from the portion of the furrow in which seeds are being deposited.

Seeds are preferably deposited from a position as far forward as possible. In this invention a seed tube preferably extends substantially vertically between the first and second scrapers, adjacent to the first and second annular members of such scrapers. The double disk scraper assembly of this invention allows such forward positioning even though the scraper blades are substantial and even though they are secured firmly by means of the attachment of the pivot post to the principal vertical support between the disks.

In a highly preferred embodiment of this invention, the first and second disks are supported on offset axes, and the first and second blades are asymmetrical such that they each terminate adjacent to the edge of their respective disks. Such offset disk positioning, known and patented in the prior art, is helpful in the cutting of furrows for planting. A single disk edge more effectively opens a furrow than a pair of adjacent disk edges. And, in this invention, it has been found that the above described asymmetrical scraper blade configuration is very effective in removing even heavy dirt clods and the like from the inside surfaces of such offset disks.

DETAILED DESCRIPTIONS OF PREFERRED EMBODIMENTS

Figure 1:
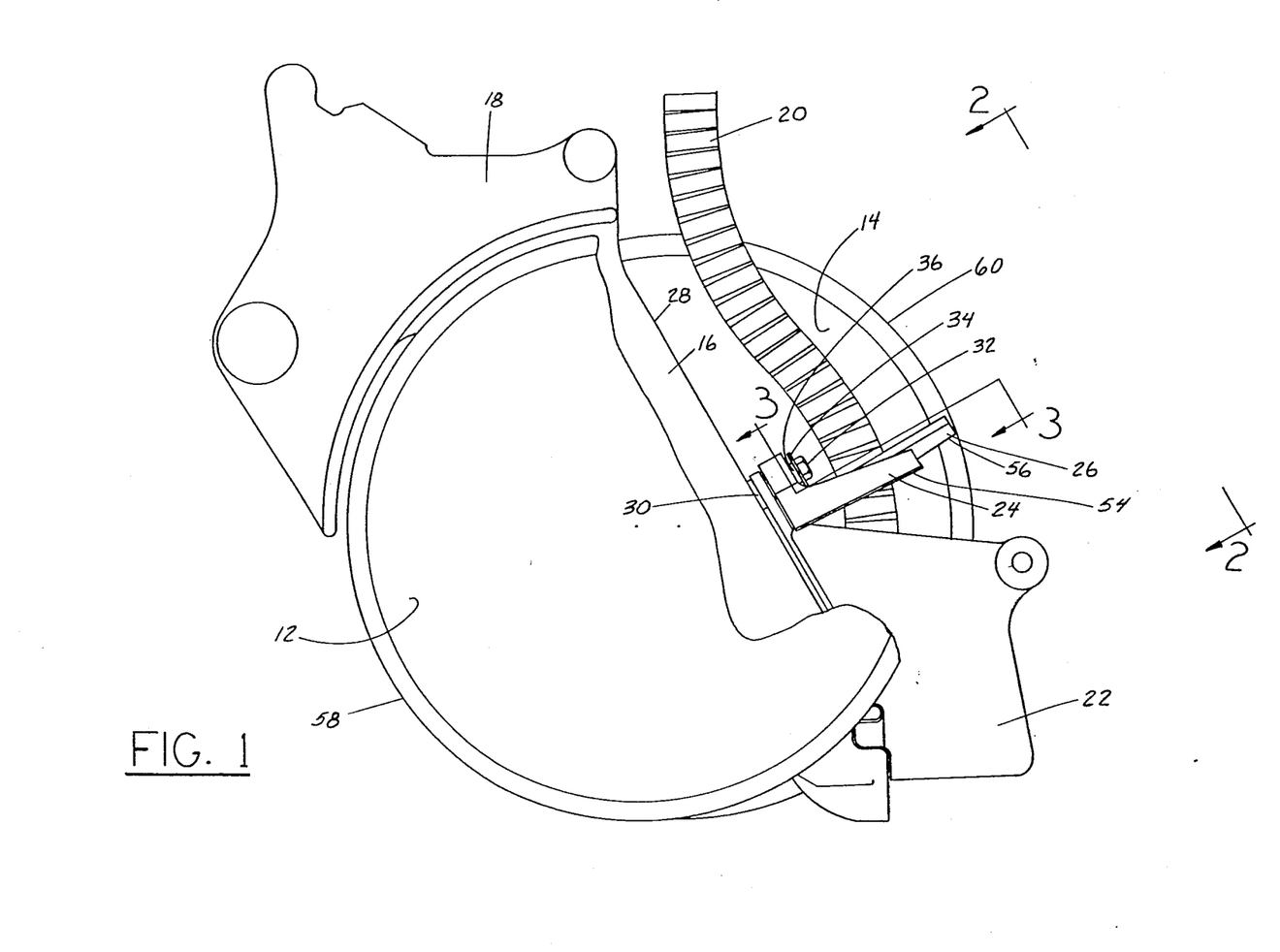
FIG. 1 is a side elevation of a double disk set including the double disk scraper assembly of this invention.
Figures 2, 3:
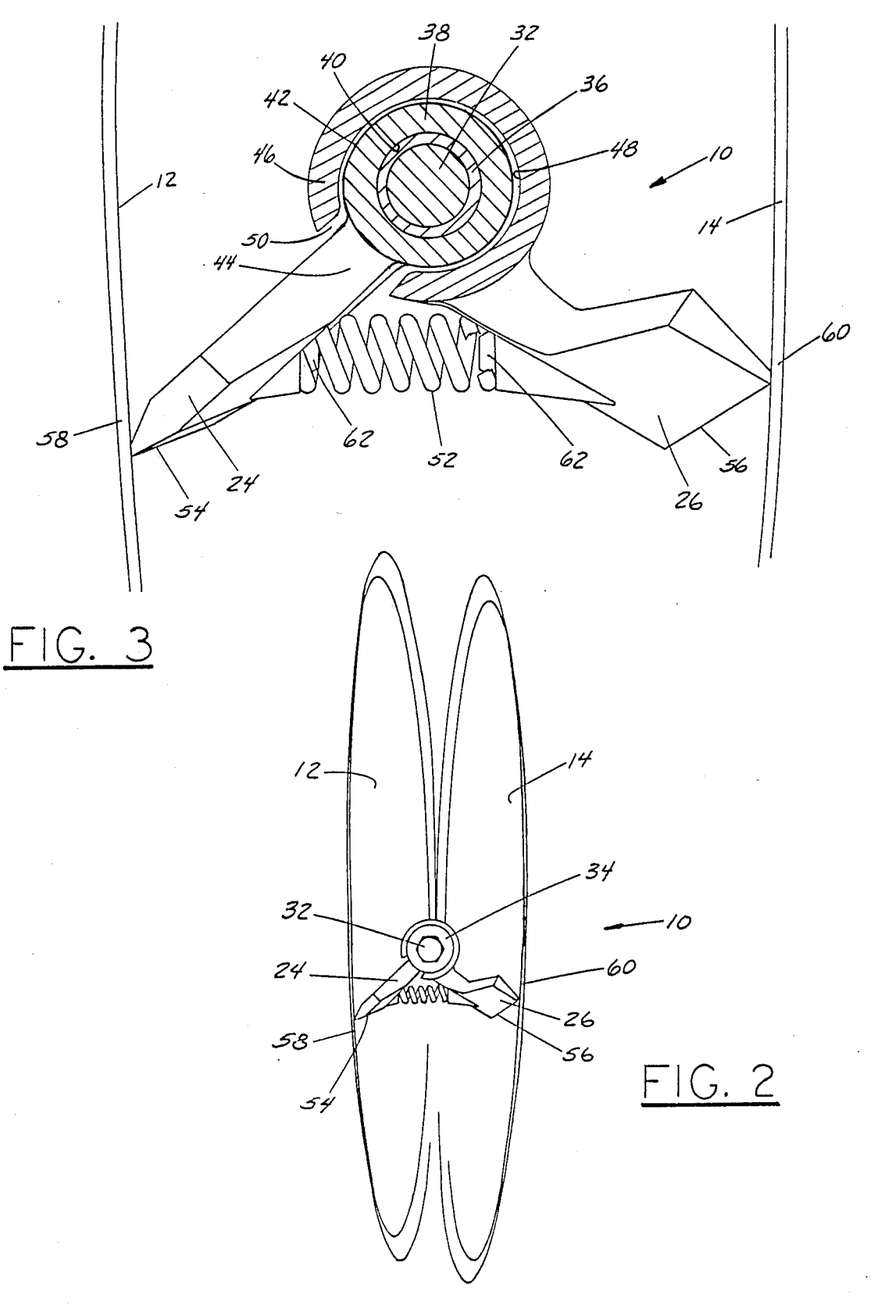
FIG. 2 is a fragmentary auxiliary view, taken from position 2—2 as indicated in FIG. 1, showing only the disks and the scraper blade assembly.
FIG. 3 is a fragmentary enlarged partially sectional view (without background) taken along section 2—2 as indicated in FIG. 1.

The figures illustrate a preferred double disk scraper assembly 10 in accordance with this invnention. As best illustrated in FIG. 1, double disk scraper assembly 10 is part of one of many double disk sets, each of which consist of a first disk 12 and a second disk 14 which are rotatably secured with respect to a vertical support 16 therebetween.

Vertical support 16 is part of a row unit casting 18 which serves to define the overall configuration of the double disk planting device. For each double disk set of the planting device, a seed tube 20 extends downwardly from the supporting structure above, and serves to convey seeds by gravity feed to the bottom of a furrow which is opened by the disk set. At its lower end, seed tube 20 is received into a furrow firming structure 22, which has a top-to-bottom opening (not shown) and which is secured with respect to vertical support 16 near the lower end thereof.

First and second scrapers 24 and 26 are secured to vertical support 16, in a manner which will hereafter be described, in a position between first and second disks 12 and 14 and immediately behind vertical support 16. First scraper 24 engages first disk 12 and second scraper 26 engages second disk 14. First and second scrapers 24 and 26 each always remain in contact with the inside surfaces of their respective disks and serve to scrape dirt from the disks as they turn during the planting operation.

Vertical support 16 has a rear surface 28 which has a raised hub 30 formed on it. A bolt 32 is in threaded engagement with vertical support 16, entering it through an opening (not shown) in hub 30. Bolt 32 extends through a washer 34 and through a cylindrical bushing 36 and when tightened clamps bushing 36 rigidly between hub 30 and washer 34. Bushing 36 serves as a pivot post, as hereafter described, for the pivoting action of first and second scrapers 24 and 26.

First scraper 24 has a first pivot end 38 which is pivotably mounted on bushing 36. First pivot end 38 is a tube-like straight annular member having a substantially cylindrical first opening 40 which receives bushing 36 and a substantially cylindrical outer surface 42. Cylindrical outer surface 42 is interrupted at one position by the extension therefrom of the remainder 44 of first scraper 24.

Second scraper 26 has a second pivot end 46 which is pivotably mounted on cylindrical outer surface 42 of first scraper 24. Second pivot end 46 is a tube-like straight annular member having a substantially cylindrical second opening 48 which receives the tube-like annular member of first scraper 24.

The tube-like annular member of second scraper 26 is interrupted by a gap 50 therealong through which remainder 44 of first scraper 24 extends. Gap 50 is wider than the portion of first scraper 24 which extends through gap 50. This allows first and second scrapers 24 and 26 to pivot independently as is necessary by virtue of the separate wobbling of first and second disks 12 and 14. However, as illustrated in FIGS. 2 and 3, gap 50 is narrow enough to impose rotational limitations on first and second scrapers 24 and 26 which are sufficient to hold spring 52 properly in place, as hereafter described.

First scraper 24 has a first blade 54 which engages the inside surface of first disk 12. Likewise, second scraper 26 has a second blade 56 which engages the inside surface of second disk 14. In a particularly preferred form of this invention, first and second disks 12 and 14 are mounted to vertical support 16 in offset positions. More specifically, first disk 12 is located somewhat forward of second disk 14, and such offset mounting allows the double disk set to more efectively cut a furrow for planting.

First and second blades 54 and 56 are asymmetrical. First blade 54 is somewhat shorter and is dimensioned to extend to the edge 58 of first disk 12. Second blade 56 is somewhat longer and is dimensioned to extend to the edge 60 of second disk 14.

Bolt 32 and bushing 36, which project rearwardly from rear surface 28 of vertical support 16, are angled somewhat above the horizontal. This serves to locate first and second blades 54 and 56 at an appropriate location around their respective disks for efficient removal of dirt. Furthermore, blades 54 and 56 are tilted off-radius with respect to their disks, such tilting being in a direction toward the rear. This off-radius orientation of first and second blades 54 and 56 tends to direct removed dirt more toward the rear as it is removed, thus minimizing any interference with the deposition of seeds at the furrow bottom.

At intermediate positions along the facing edges of first and second scrapers 24 and 26 are a pair of opposed substantially coaxially aligned nubs 62. The open ends of coil spring 52 are placed over nubs 62 and such engagement of spring 52 with nubs 62 holds spring 52 reliably in place between first and second scrapers 24 and 26.

Coil spring 52 is held in compression and biases first and second scrapers 24 and 26 into firm engagement with their respective disks. Coil spring 52 is chosen such that scrapers 24 and 26 will not exert excessive force on disks 12 and 14 which could interfere with their essentially free turning. The limited width of gap 50, referred to above, serves to restrict the relative rotational positions of first and second scrapers 24 and 26, and in doing so serves to maintain coil spring 52 in line and in place.

Double disk scraper assemblies in accordance with this invention may be made using parts and materials well known to those skilled in the art. The scraper blades are preferably made of abrasion-resistant cast iron.

While the principles of this invention have been described in connection with specific embodiments, it should be understood clearly that these descriptions are made only by way of example and are not intended to limit the scope of the invention.

What is claimed:

1. In a double disk scraper assembly of the type with a support between first and second disks, scraper blades secured to the support, and means biasing the blades into contact with the inside surfaces of the disks, the improvement comprising:
    a pivot post projecting rearwardly from the support along an axis;
    a first scraper having a first pivot end pivotably mounted on the pivot post and a first blade engaging the inside surface of the first disk, said first pivot end having an axially-aligned outside bearing surface with an axial length extending along the post; and
    a second scraper having a second blade engaging the inside surface of the second disk and a second pivot end pivotably mounted around and in pivoting contact with said outside bearing surface of the first pivot end along substantially all of said axial length thereof.

2. The assembly of claim 1 further having a seed tube extending substantially vertically between the first and second scaper blades, adjacent to the first and second annular members.

3. The double disk scraper assembly of claim 1 wherein the gap is wider than the first scraper in the gap, whereby the first and second scrapers can pivot independently, and wherein the gap is narrow enough to impose rotational limitations sufficient to keep the biasing means in place.

4. The double disk scraper assembly of claim 1 wherein the rearward projection of the pivot post is angled above the horizontal.

5. The double disk scraper assembly of claim 4 wherein the blades are tilted off-radius with respect to the disks in a direction toward the rear, whereby dirt scraped from the disks is directed more toward the rear.

6. The double disk scraper assembly of claim 1 wherein each of the first and second scrapers have means at intermediate positions therealong for securing a single biasing means in compression, whereby the first and second scrapers are spread into engagement with their respective disks.

7. The double disk scraper assembly of claim 6 wherein:
    the securing means are a pair of opposed substantially coaxially-aligned nubs; and
    the biasing means is a coil spring receiving the nubs at either end.

8. The double disk scraper assembly of claim 1 wherein:
    the first and second disks are supported on offset axes; and
    the first and second blades are asymmetrical such that they each terminate adjacent to the edge of their respective disks.

9. The double disk scraper assembly of claim 3 wherein each of the first and second scrapers have means at intermediate positions therealong for securing a single biasing means in compression, whereby the first and second scrapers are spread into engagement with their respective disks.

10. The double disk scraper assembly of claim 9 wherein:
    the securing means are a pair of opposed substantially coaxially-aligned nubs; and
    the biasing means is a coil spring receiving the nubs at either end.

11. The double disk scraper assembly of claim 3 wherein the rearward projection of the pivot post is angled above the horizontal.

12. The double disk scraper assembly of claim 11 wherein the blades are tilted off-radius with respect to the disks in a direction toward the rear, whereby dirt scraped from the disks is directed more toward the rear.

13. The double disk scraper assembly of claim 3 wherein:
    the first and second disks are supported on offset axes; and
    the first and second blades are asymmetrical such that they each terminate adjacent to the edge of their respective disks.

14. The double disk scraper assembly of claim 10 wherein the rearward projection of the pivot post is angled above the horizontal.

15. The double disk scraper assembly of claim 14 wherein the blades are tilted off-radius with respect to the disks in a direction toward the rear, whereby dirt scraped from the disks is directed more toward the rear.

16. The double disk scraper assembly of claim 15 wherein:
    the first and second disks are supported on offset axes; and
    the first and second blades are asymmetrical such that they each terminate adjacent to the edge of their respective disks.

17. The assembly of claim 16 further having a seed tube extending substantially vertically between the first and second scaper blades, adjacent to the first and second annular members.

18. In a double disk scraper assembly of the type with a support between first and second disks, scraper blades secured to the support, and means biasing the blades into contact with the inside surfaces of the disks, the improvement comprising:
    a pivot post projecting rearwardly from the support;

a first scraper having a first pivot end pivotably mounted on the pivot post and a first blade engaging the inside surface of the first disk, the first pivot end being a first tube-like straight annular member with a substantially cylindrical first opening receiving the post and a substantially cylindrical outer surface interrupted at one position by extension therefrom of the remainder of the first scraper; and a second scraper having a second pivot end pivotably mounted on the first pivot end and a second blade engaging the inside surface of the second disk, the second pivot end being a second tube-like straight annular member with a substantially cylindrical second opening receiving the first annular member, the second annular member being interrupted by a gap therealong through which said remainder of the first scraper extends.

* * * * *

UNITED STATES PATENT AND TRADEMARK OFFICE
CERTIFICATE OF CORRECTION

PATENT NO. : 4,736,803

DATED : April 12, 1988

INVENTOR(S) : Daniel E. Roush

It is certified that error appears in the above-identified patent and that said Letters Patent is hereby corrected as shown below:

In the Abstract, line 8, change "The" to --They--.

Column 1, line 17, change "ot" to --of--.

Column 1, line 37, change "scraper" to --scrapers--.

Column 2, line 28, change "scrape" to --scraper--.

Column 3, line 10, change "tan" to --an--.

Column 3, line 52, change "invnention." to --invention.--.

The entire claim section as printed in the patent should be disregarded. The corrected version of the claims section is as printed on the annexed pages of this Certificate.

UNITED STATES PATENT AND TRADEMARK OFFICE
CERTIFICATE OF CORRECTION

PATENT NO. : 4,736,803
DATED : April 12, 1988
INVENTOR(S) : Daniel E. Roush

It is certified that error appears in the above-identified patent and that said Letters Patent is hereby corrected as shown below:

WHAT IS CLAIMED:

1. In a double disk scraper assembly of the type with a support between first and second disks, scraper blades secured to the support, and means biasing the blades into contact with the inside surfaces of the disks, the improvement comprising:

- a pivot post projecting rearwardly from the support along an axis;
   - a first scraper having a first pivot end pivotably mounted on the pivot post and a first blade engaging the inside surface of the first disk, said first pivot end having an axially-aligned outside bearing surface with an axial length extending along the post; and
   - a second scraper having a second blade engaging the inside surface of the second disk and a second pivot end pivotably mounted around and in pivoting contact with said outside bearing surface of the first pivot end along substantially all of said axial length thereof.

2. The double disk scraper assembly of claim 1 wherein the rearward projection of the pivot post is angled above the horizontal.

3. The double disk scraper assembly of claim 2 wherein the blades are tilted off-radius with respect to the disks in a direction toward the rear, whereby dirt scraped from the disks is directed more toward the rear.

UNITED STATES PATENT AND TRADEMARK OFFICE
CERTIFICATE OF CORRECTION

PATENT NO. : 4,736,803
DATED : April 12, 1988
INVENTOR(S) : Daniel E. Roush

It is certified that error appears in the above-identified patent and that said Letters Patent is hereby corrected as shown below:

4. The double disk scraper assembly of claim 1 wherein each of the first and second scrapers have means at intermediate positions therealong for securing a single biasing means in compression, whereby the first and second scrapers are spread into engagement with their respective disks.

5. The double disk scraper assembly of claim 4 wherein:

-- the securing means are a pair of opposed substantially coaxially-aligned nubs; and -- the biasing means is a coil spring receiving the nubs at either end.

6. The double disk scraper assembly of claim 1 wherein:

-- the first and second disks are supported on offset axes; and

-- the first and second blades are asymmetrical such that they each terminate adjacent to the edge of their respective disks.

UNITED STATES PATENT AND TRADEMARK OFFICE
CERTIFICATE OF CORRECTION

PATENT NO. : 4,736,803
DATED : April 12, 1988
INVENTOR(S) : Daniel E. Roush

It is certified that error appears in the above-identified patent and that said Letters Patent is hereby corrected as shown below:

7. In a double disk scraper assembly of the type with a support between first and second disks, scraper blades secured to the support, and means biasing the blades into contact with the inside surfaces of the disks, the improvement comprising:

- a pivot post projecting rearwardly from the support;
- a first scraper having a first pivot end pivotably mounted on the pivot post and a first blade engaging the inside surface of the first disk, the first pivot end being a first tube-like straight annular member with a substantially cylindrical first opening receiving the post and a substantially cylindrical outer surface interrupted at one position by extension therefrom of the remainder of the first scraper; and
- a second scraper having a second pivot end pivotably mounted on the first pivot end and a second blade engaging the inside surface of the second disk, the second pivot end being a second tube-like straight annular member with a substantially cylindrical second opening receiving the first annular member, the second annular member being interrupted by a gap therealong through which said remainder of the first scraper extends.

UNITED STATES PATENT AND TRADEMARK OFFICE
CERTIFICATE OF CORRECTION

PATENT NO. : 4,736,803
DATED : April 12, 1988
INVENTOR(S) : Daniel E. Roush

It is certified that error appears in the above-identified patent and that said Letters Patent is hereby corrected as shown below:

8. The assembly of claim 7 further having a seed tube extending substantially vertically between the first and second scaper blades, adjacent to the first and second annular members.

9. The double disk scraper assembly of claim 7 wherein the gap is wider than the first scraper in the gap, whereby the first and second scrapers can pivot independently, and wherein the gap is narrow enough to impose rotational limitations sufficient to keep the biasing means in place.

10. The double disk scraper assembly of claim 9 wherein each of the first and second scrapers have means at intermediate positions therealong for securing a single biasing means in compression, whereby the first and second scrapers are spread into engagement with their respective disks.

11. The double disk scraper assembly of claim 10 wherein:
-- the securing means are a pair of opposed substantially coaxially-aligned nubs; and
-- the biasing means is a coil spring receiving the nubs at either end.

12. The double disk scraper assembly of claim 9 wherein the rearward projection of the pivot post is angled above the horizontal.

UNITED STATES PATENT AND TRADEMARK OFFICE
CERTIFICATE OF CORRECTION

PATENT NO. : 4,736,803
DATED : April 12, 1988
INVENTOR(S) : Daniel E. Roush

It is certified that error appears in the above-identified patent and that said Letters Patent is hereby corrected as shown below:

13. The double disk scraper assembly of claim 12 wherein the blades are tilted off-radius with respect to the disks in a direction toward the rear, whereby dirt scraped from the disks is directed more toward the rear.

14. The double disk scraper assembly of claim 9 wherein:
   -- the first and second disks are supported on offset axes; and
   -- the first and second blades are asymmetrical such that they each terminate adjacent to the edge of their respective disks.

15. The double disk scraper assembly of claim 11 wherein the rearward projection of the pivot post is angled above the horizontal.

16. The double disk scraper assembly of claim 15 wherein the blades are tilted off-radius with respect to the disks in a direction toward the rear, whereby dirt scraped from the disks is directed more toward the rear.

17. The double disk scraper assembly of claim 16 wherein:
   -- the first and second disks are supported on offset axes; and
   -- the first and second blades are asymmetrical such that they each terminate adjacent to the edge of their respective disks.

UNITED STATES PATENT AND TRADEMARK OFFICE
CERTIFICATE OF CORRECTION

PATENT NO. : 4,736,803

DATED : April 12, 1988

INVENTOR(S) : Daniel E. Roush

It is certified that error appears in the above-identified patent and that said Letters Patent is hereby corrected as shown below:

18. The assembly of claim 17 further having a seed tube extending substantially vertically between the first and second scaper blades, adjacent to the first and second annular members.

Signed and Sealed this

Sixth Day of December, 1988

Attest:

DONALD J. QUIGG

Attesting Officer

Commissioner of Patents and Trademarks